Jan. 21, 1941.  L. E. WHITTAKER  2,229,157
VIEW FINDER CONTROL
Filed Jan. 12, 1938    5 Sheets-Sheet 1
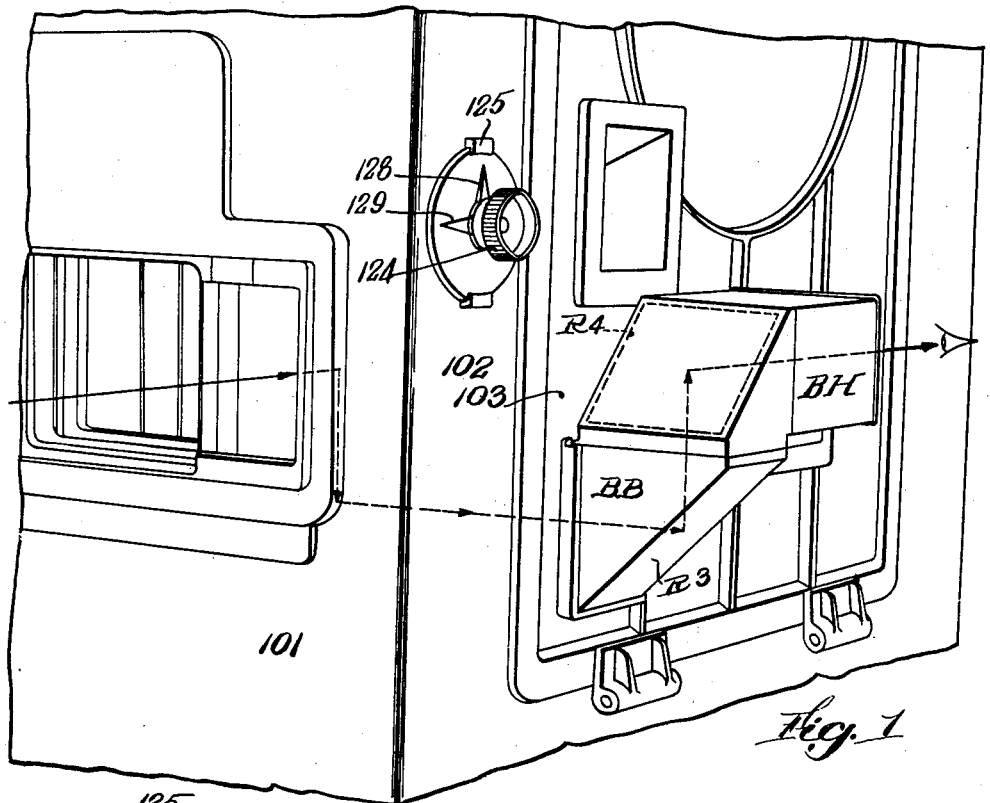
Fig. 1
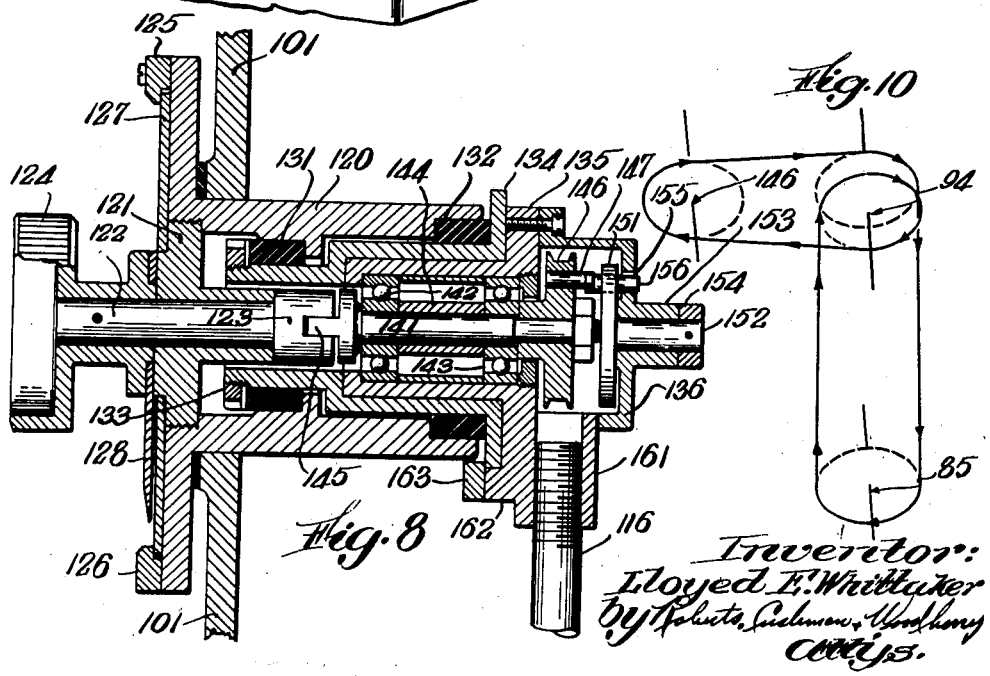
Fig. 8
Fig. 10
Inventor:
Lloyed E. Whittaker Jan. 21, 1941.   L. E. WHITTAKER   2,229,157
VIEW FINDER CONTROL
Filed Jan. 12, 1938   5 Sheets-Sheet 2
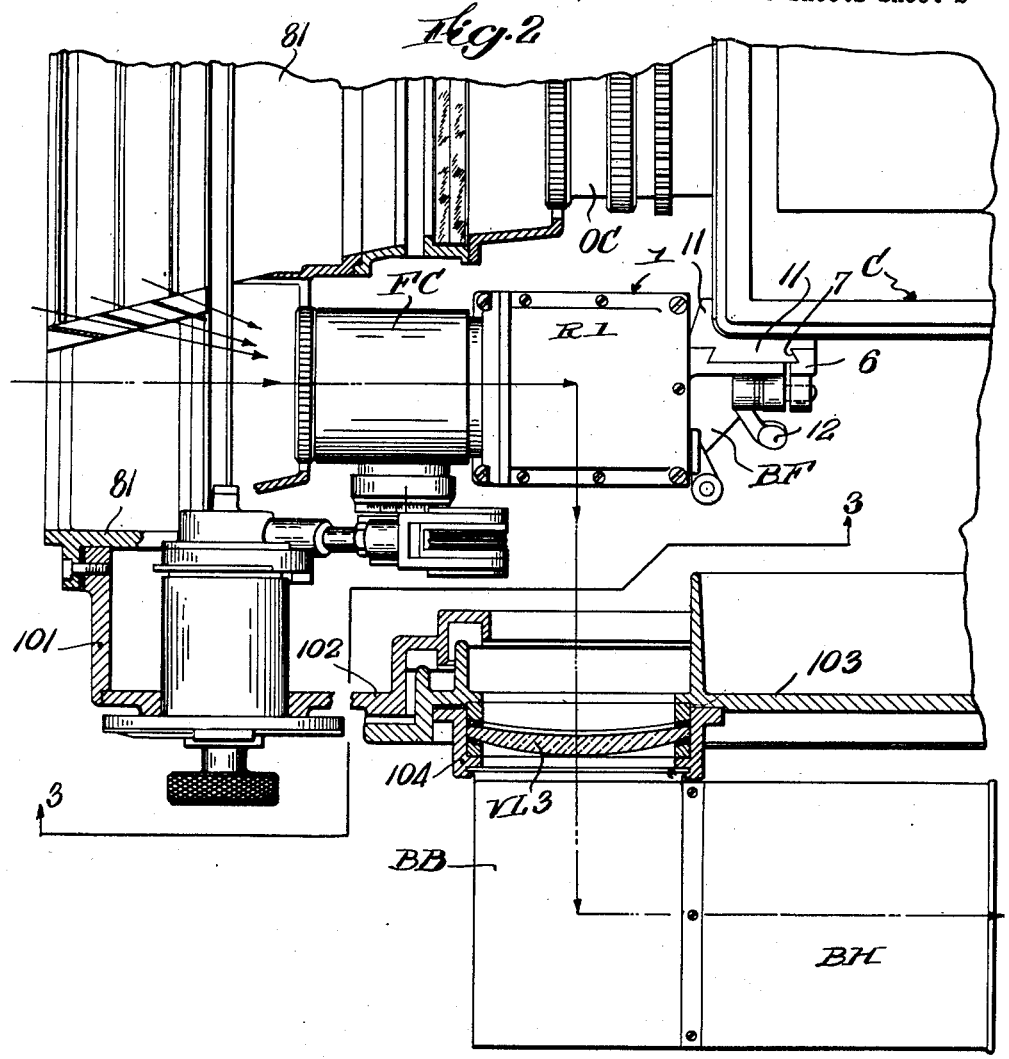
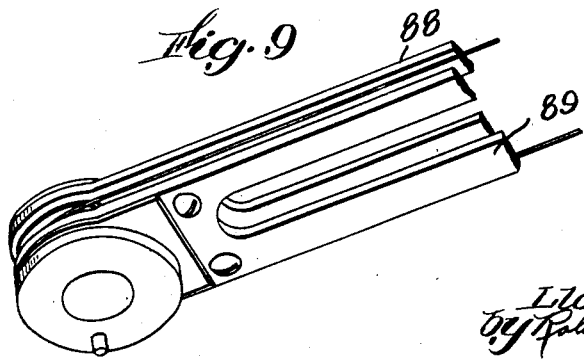
Inventor:
Lloyed E. Whittaker

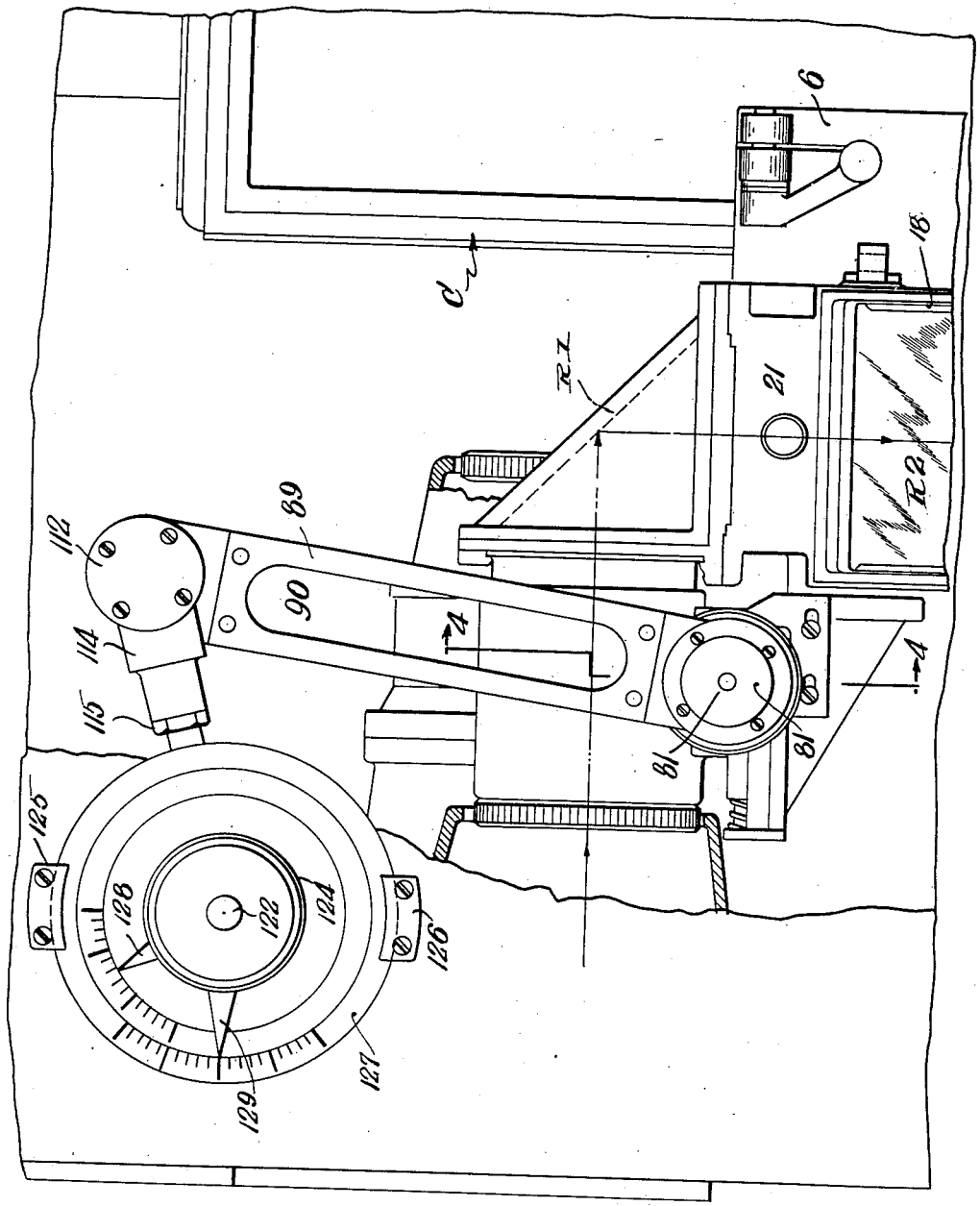

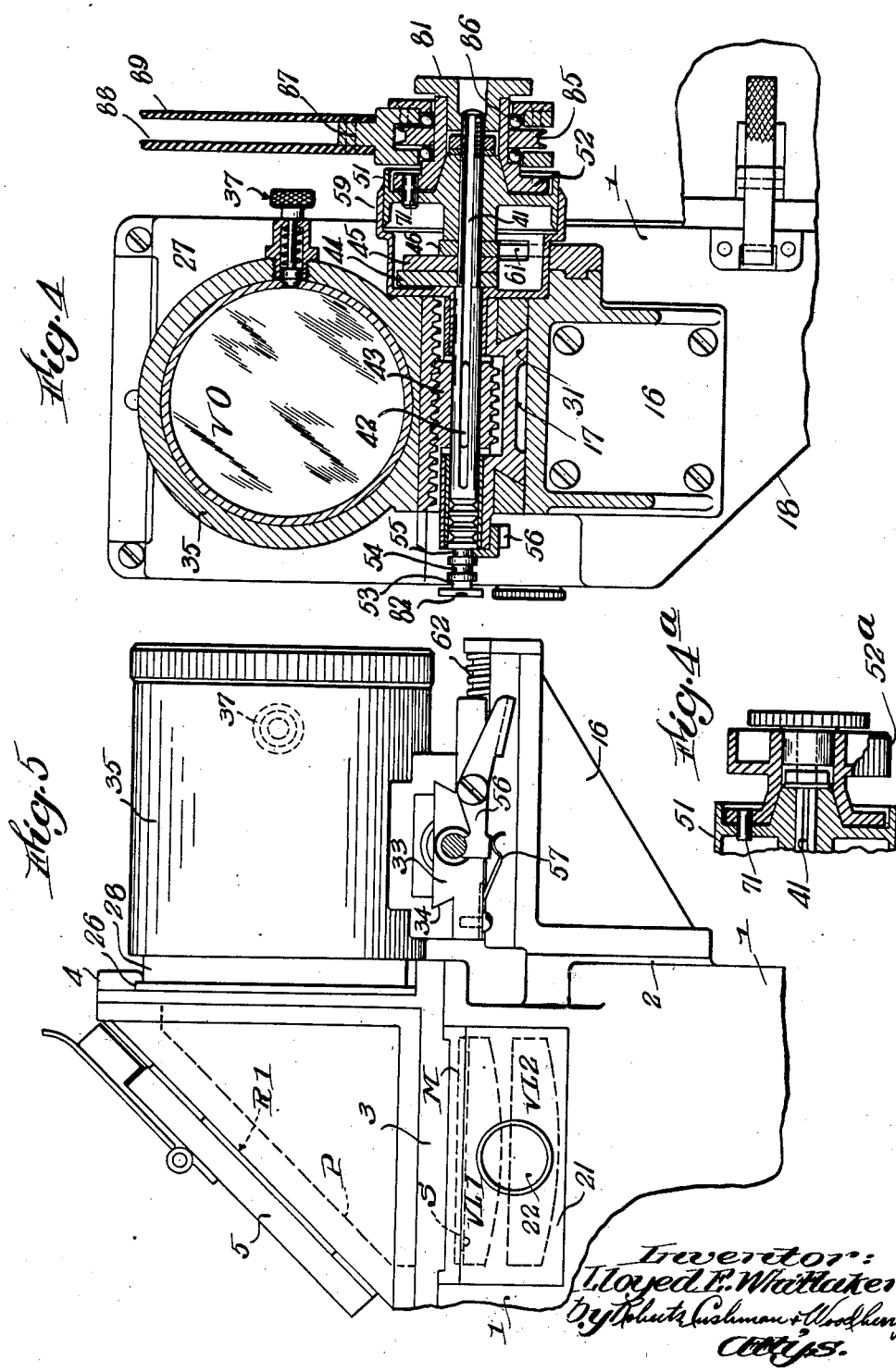

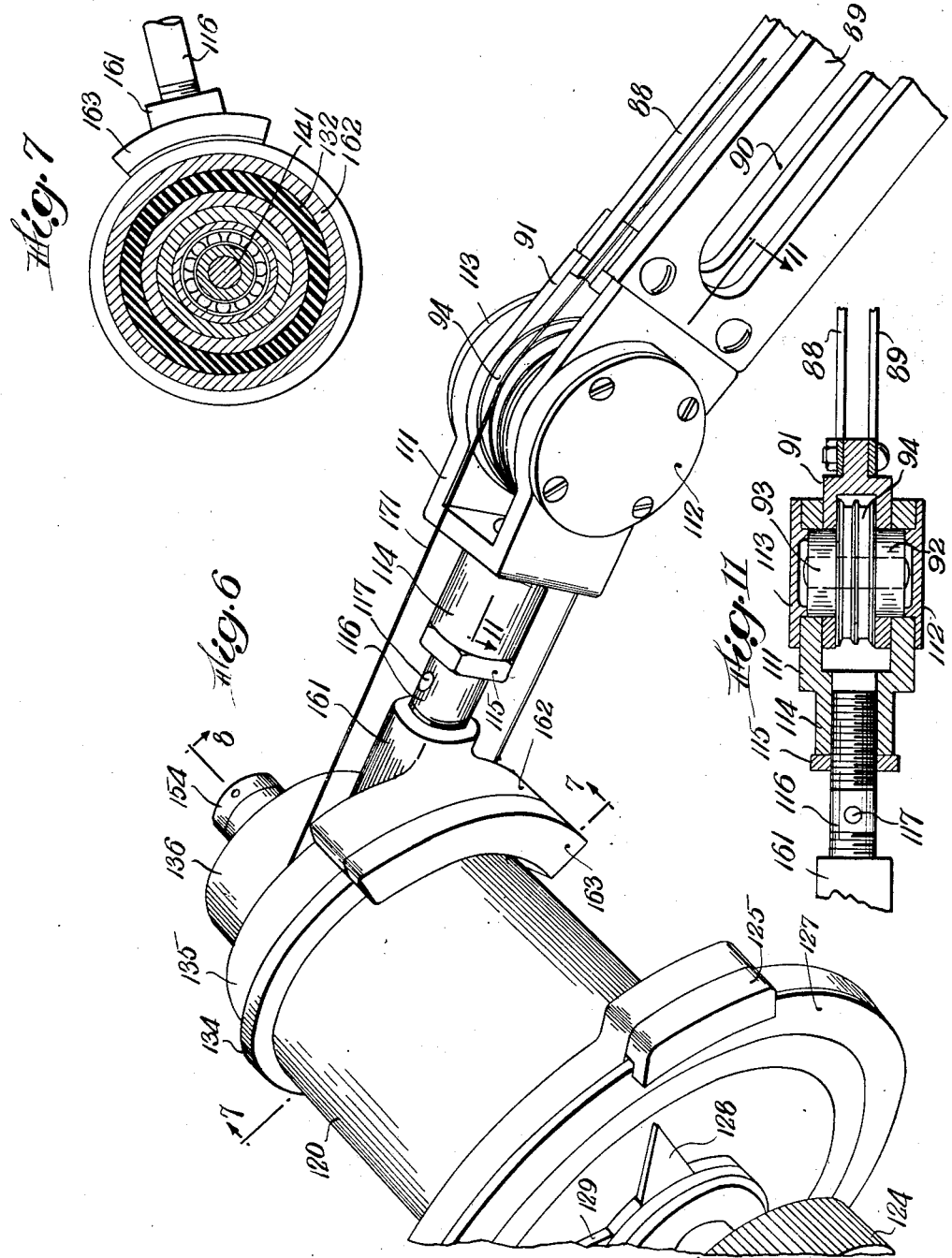

Patented Jan. 21, 1941

2,229,157

UNITED STATES PATENT OFFICE 2,229,157

VIEW FINDER CONTROL

Lloyed E. Whittaker, Los Angeles, Calif., assignor to Technicolor Motion Picture Corporation, Hollywood, Calif., a corporation of Maine Application January 12, 1938, Serial No. 184,546

6 Claims. (Cl. 88—16)

This invention deals with remote control arrangements for photographic apparatus, and more particularly with a control transmission between the enclosure of a motion picture camera and the view finder movement of the camera.

Some of the principal objects of the invention are to provide accurate mechanical connection between a controlling device and a controlled device on relatively moving parts of photographic apparatus, which connection suppresses for practical purposes any transmission of sound or undesired vibrations between the two parts, which follows the relative movement between the parts without in any way interfering with the mechanical transmission of motion therebetween, and which can be easily detached from and again connected to the camera.

These and other objects and features will be apparent from the following detailed description of a practical embodiment explaining the genus of the invention. The description refers to drawings in which:

Fig. 1 is an isometric view of part of a motion picture camera embodying my invention;

Fig. 2 is a plan view of such a camera with the blimp and lens hood in horizontal section;

Fig. 3 is a section on lines 3—3 of Fig. 2;

Fig. 4 is a section on lines 4—4 of Fig. 3;

Fig. 4ᵃ is a section similar to Fig. 4, showing a knob for direct control;

Fig. 5 is a side view corresponding to Fig. 4;

Fig. 6 is an isometric view of the upper part of the transmission linkage;

Fig. 7 is a section on the lines 7—7 of Fig. 6;

Fig. 8 is a section on lines 8—8 of Fig. 6;

Fig. 9 is an isometric view of one-half of the transmission link;

Fig. 10 is a diagram of the manner in which the transmission wire is wound on its pulleys; and Fig. 11 is a section on lines 11—11 of Fig. 6.

Referring to Figs. 1, 2 and 3, C is a camera housing carrying camera lens OC with hood 81. Attached to the camera housing at 6 is a view finder base BF carrying a view finder lens FC. As shown in detail in Figs. 4 and 5, view finder base BF consists of a cast frame or box 1 from which extends downwardly a mirror support having an inclined wall 18 upon which reflector R2 is mounted (Fig. 3). Screwed to the top of box 1 is a prism support 3 having an upwardly extending frame 4. Integral with box 1 is the above-mentioned mounting flange 6 having split dovetails 7 (Fig. 2) adapted to engage the correspondingly-shaped flange 11 of camera C. By means of screws 12, the dovetails can be rigidly clamped together.

A bracket 16 is screwed to the front face of mirror extension 2 of box 1 (Figs. 4, 5), the top face of bracket 16 being provided with a dovetailed groove 17 (Fig. 4).

A lens support frame or drawer 21 slides within box 1 (Fig. 5); supporting view finder lenses VL1 and VL2 which can be removed from box 1 by means of knob 22. The flat upper surface of lens VL1 forms a screen S above which a matte M slides in suitable guides.

Frame 4 (Figs. 4 and 5) has grooves 26 guiding a shield 27 having a circular opening surrounded by sleeve 28. Shield 27 extends far enough beyond either side of frame 4 to exclude light from the window of the latter if it slides to the right or left.

Dovetail groove 17 of bracket 16 (Figs. 4 and 5) supports a correspondingly machined intermediate slide 31 which has at its top a dovetail 33 of similar shape but at right angles to lower dovetail 32. With dovetails 34, a master mount tube 35 moves laterally upon dovetails 33 of slide 31. Sleeve 28 extends into the interior of mount 35 and it will be evident that shield 27 following the lateral movement of mount 35 and sleeve 28, and the overlapping portions of mount and sleeve, form a light seal between the compartment containing prism P and the lens mount 35. View finder objectives VO can be inserted into mount 35, secured against rotation by catch 37 (Fig. 4).

A shaft 41 (Fig. 4) is journaled in slide 31, at right angles to the optical axis of the objectives. By means of key and keyway arrangement 42 (Fig. 4), shaft 41 slides within worm 43 which is secured against axial movement by suitable shoulders of slide 31. Fixed to shaft 41 are two cams 44, 45 and a collar 46. Likewise fastened to shaft 41 are a scale drum 51 and sleeve 52. At the other end, shaft 41 has three circumferentially grooved portions 53, 54, 55 selectively engaged by catch 56 pressed towards the shaft by spring 57. Upon pressing the outer end of catch 56 upwardly, the shaft is released and can be moved axially. In this manner either of cams 44 or 45, or collar 46, can be moved opposite a finger 61, adjustably secured to bracket 16. A helical spring 62 (Fig. 5) presses slide 31 and with it the cams against stop 61.

It will now be evident that, upon rotating shaft 41, one of the cams will move slide 31 relatively to bracket 16 with groove 17 while, at the same time, worm 43 moves lens mount 35 relatively to slide 31, at right angles to the optical axis of lens VO. As described at length in copending application Serial No. 143,308, filed May 18, 1937, the lateral (worm) movement compensates the parallax between camera and view finder images, and the axial (cam) movement takes care of the focus adjustment. By suitably dimensioning the cams with respect to the worm pitch, a given ratio between parallax compensation and focusing movement can be determined.

Mattes corresponding to the finder objectives and cams, respectively, and to each camera lens of two groups of such lenses used with a respective finder objective, are provided and can be conveniently inserted in finder block 1, as shown in Fig. 5.

Viewing elements for deflecting the finder beam into a direction parallel to the camera axis are preferably mounted on the blimp wall next to the basic view finder unit on the camera, as shown in Figs. 1 and 2. In these figures, 101 is the blimp housing with side wall 102 into which is set a door 103. Door 103 has an insert 104 in which viewing lens VL3 is mounted and which has on the outside grooves into which a blimp mirror box BB can be inserted. Mounted within this box are reflectors R3 and R4 in the manner indicated in Fig. 1, and a viewing hood BH excludes stray light.

It will be observed that lens VL3 serves at the same time as enlarging and as sound excluding element, an arrangement which reduces to a minimum the elements necessary for successful operation. Further, there is no mechanical sound conveying connection between the basic finder unit on the camera and the viewing elements on the blimp; this arrangement is acoustically satisfactory and permits mounting of the optically critical finder elements on the camera.

Referring now especially to Fig. 4, fixed to sleeve 52 is a pulley 85, so that rotatory motion will be transmitted from this pulley through sleeve 52, pin 71 and drum 51 to shaft 41. Mounted on sleeve 52 by means of ball bearings 86 is a double eye piece 87 to which are screwed rod links 88, 89 preferably made of non-metallic sound-absorbing material, as fiber or micarta, and having cut-outs 90 (Figs. 3 and 6), which likewise reduce sound transmission through these links. Screwed to the other ends of links 88, 89 is a second double eye piece 91 (Figs. 6 and 11) supporting a ball bearing 92 wherein rotates the shaft 93 of a double pulley 94. Engaging the outer ring of ball bearing 92, similar to eye piece 91, is arranged a pivot piece 111 secured in place by means of two cover plates 112, 113 screwed thereto. It will be evident that this arrangement permits relative rotatory movement of eye piece 91, pulley 94 and pivot piece 111. Screwed into the female thread of extension sleeve 114 and secured therein by nut 115, is a connecting turnbuckle shaft 116 having opposite threads on its respective ends and in the middle a hole 117 by means of which it can be turned for adjusting it.

Mounted in an opening of blimp wall 101 (Figs. 6, 7 and 8) is a control housing 120, preferably made of aluminum into which is screwed a journal sleeve 121 supporting a control knob shaft 122 to one end of which is secured a slotted collar 123 made of sound dampening material, as for example fiber. A control knob 124 is pinned to the other end of shaft 122. Adjustably mounted on housing 120, by means of clamps 125, 126, is a dial ring 127, a corresponding indicator 128, 129 being secured to knob 124.

Secured within housing 120 by means of rubber sleeves 131, 132 and mounting ring 133 is a control shaft housing 134 within which is rotatably supported a bearing housing 135, and screwed thereto a safety stop housing 136. A control shaft 141 rotates in ball bearings 142, 143 distanced by sleeve 144, and has at one end a ridge 145 dimensioned for engagement with the slot of fiber collar 123, above described. To the other end of shaft 141 is fixed a pulley 146 carrying a pin 147.

A stop disk 151 on shaft 152 rotates in journal sleeve 153 of housing 136, being secured against longitudinal movement by collar 154 pinned to shaft 152. Disk 151 has a safety stop pin 156 which extends on one side into the path of pin 147 and on the other side into a slot 155 of housing 136. Slot 155 is long enough to permit pin 156 to rotate around the drive axis to such an extent that pulley 146 with pin 147 are permitted to perform a full turn, this construction compensating for the thickness of the two pins.

The above-described shaft 116 is screwed into the female thread of extension 161 of bearing housing 135. This extension is shaped to form a flange sector 162 (Fig. 6) to which is screwed a mounting sector 163 which secures bearing housing 135 against longitudinal movement relatively to control shaft housing 134.

A piano wire 171 is wound around pulleys 146, 94 and 85, as indicated in Fig. 10.

It will now be evident that rotation of knob 124 turns pulley 146 and that this movement is transmitted through wire 171 and pulleys 94 and 85 to shaft 41 which again rotates worm 43 effecting axial and lateral adjustment of finder lens VO, as above described. Due to the articulated connection between sleeve 52 and eye piece 87, eye piece 91 and pivot piece 111, and bearing housing 135 and control shaft housing 134, the transmission link can easily follow the axial focusing movement of the finder lens. As described above, different focusing movements are obtained by shifting shaft 41 along its axis, by means of knob 81.

The tension of the piano wire can be adjusted by loosening nut 115 and rotating shaft 116 in the appropriate direction.

Indicators 128 and 129 and two corresponding dial gradations on disk 127 (Fig. 3) correspond to different settings of shaft 41, as above described.

The sound dampening elements comprising arms 88, 89, rubber sleeves 131 and 132 and fiber collar 123, effectively prevent any sound transmission from the camera to the blimp, there being no direct metallic contact between any elements intermediate these parts; fiber arms 88, 89 constitute an acoustic filter eliminating any vibrations that might be transmitted as far as intermediate pulley 94.

In operating the camera view finder by means of the control device according to my invention, knob 124 is rotated by reading the focusing data on scales 127. The linkage transmits this rotatory movement to pulley 85, as above described, following the focusing and parallax compensating movements of the view finder lens due to articulation about the axes of the three pulleys. When the camera and view finder lenses are changed, the appropriate cam of shaft 41 is shifted into operative position by means of knob 81 and stop 56 (Fig. 4), the transmission link following this movement due to the rotatory movement of linkage shaft 116, as above described when referring to the parallax adjustment of the view finder lens.

When it is desired to use the camera without blimp, the linkage can be conveniently detached by unscrewing knob 81 whereupon sleeve 52 can be easily removed from drum 51 and replaced by a sleeve 52ª having a knob for direct operation, as shown in Fig. 4ª.

It should be understood that the present disclosure is for the purpose of illustration only and that this invention includes all modifications and equivalents which fall within the scope of the appended claims.

I claim:

1. A device of the character described comprising apparatus confining means, an optical system, means to mount said system on said confining means for adjustment relatively thereto in axial and in lateral directions, means for controlling said mounting means secured thereon for movement with said optical system, means for actuating said controlling means mounted on said confining means, and a universal link between said controlling means and said actuating means for transmitting motion therebetween.

2. A device of the character described comprising apparatus confining means, an optical system, means to mount said system on said confining means for sliding motion relatively thereto in axial and in lateral directions, means for controlling said mounting means secured thereon for movement with said optical system and rotation relatively thereto, means for actuating said controlling means rotatably mounted on said confining means, and a universal link between said controlling means and said actuating means for transmitting rotatory motion from said actuating means to said controlling means.

3. A device of the character described comprising photographic apparatus, a sound absorbing housing for said apparatus, an optical system mounted on said apparatus for adjustment relatively thereto, means for controlling said adjustment moving with said optical system, means for actuating said controlling means mounted on said housing, and a link for transmitting motion from said actuating means to said controlling means, said link including a wire and pulley drive and pulley support means of sound dampening material for limiting sound transmission between said apparatus and said housing.

4. A device of the character described comprising apparatus confining means, an optical system mounted on said confining means for sliding motion relatively thereto, means for controlling said sliding motion moving with said optical system and rotating relatively thereto, means for actuating said controlling means rotatably mounted on said confining means, a pulley fastened to said controlling means, a pulley fastened to said actuating means, two link members one rotatably connected to said controlling means and the other rotatably connected to said actuating means and the two members connected to form an articulated joint, a pulley at said joint, and a belt transmission connecting said pulleys.

5. A device of the character described comprising an apparatus housing, an optical system mounted on said housing for sliding adjustment relatively thereto, means for controlling said sliding adjustment moving with said optical system and rotating relatively thereto, means for actuating said controlling means rotatably mounted on said housing, and a link between said optical system and said housing for transmitting rotatory motion therebetween while yielding to variations of position of said system and said housing, said link including an articulated support of sound dampening material and mounted on said support a belt drive from said actuating means to said controlling means.

6. A device of the character described comprising a photographic camera; a view finder lens mounted on said camera for movement relatively to said camera; a drive for moving said lens controlled by a pulley moving with the lens; a sound dampening housing substantially enclosing said camera; actuating means mounted on said housing including a second pulley, control means for rotating said pulley, and means indicating the position of said pulley; a link one end of which is mounted for rotation about the axis of said first pulley; a second link one end of which is mounted for rotation about the axis of said second pulley; means forming a rotatory joint of the free ends of said links and including a third pulley mounted for rotation about the axis of said joint, at least one of said links being adjustable regarding its length and at least one of said links being constructed to suppress sound transmission; and a wire trained over said pulleys to transmit movement from said control means to said drive, the tension of said wire being regulated by said adjustment of the length of one of said links and remaining substantially constant upon relative movement of said lens and said housing due to the constant combined length of said joined links.

LLOYED E. WHITTAKER.